United States Patent
Halfmann et al.

(10) Patent No.: US 8,391,151 B2
(45) Date of Patent: Mar. 5, 2013

(54) INTER-NETWORK-NODES FLOW CONTROL

(75) Inventors: Ruediger Halfmann, Otterberg (DE); Jijun Luo, München (DE); Egon Schulz, München (DE); Yikang Xiang, München (DE)

(73) Assignee: Nokia Siemens Networks Oy, Espoo (FI)

( * ) Notice: Subject to any disclaimer, the term of this patent is extended or adjusted under 35 U.S.C. 154(b) by 298 days.

(21) Appl. No.: 12/919,288

(22) PCT Filed: Feb. 16, 2009
(Under 37 CFR 1.47)

(86) PCT No.: PCT/EP2009/051768
§ 371 (c)(1),
(2), (4) Date: Sep. 20, 2010

(87) PCT Pub. No.: WO2009/106446
PCT Pub. Date: Sep. 3, 2009

(65) Prior Publication Data
US 2011/0063977 A1    Mar. 17, 2011

(30) Foreign Application Priority Data
Feb. 27, 2008    (EP) .................................. 08003561

(51) Int. Cl.
*H04W 36/00* (2009.01)
(52) U.S. Cl. .................... 370/235; 370/328; 370/331
(58) Field of Classification Search .............. 370/235, 370/328, 331
See application file for complete search history.

(56) References Cited

U.S. PATENT DOCUMENTS

| | | | |
|---|---|---|---|
| 2002/0118639 A1 | 8/2002 | Chintada et al. | 370/230 |
| 2005/0025057 A1 | 2/2005 | Huo | 370/235.1 |
| 2009/0047956 A1 * | 2/2009 | Moe et al. | 455/436 |
| 2009/0070694 A1 * | 3/2009 | Ore et al. | 715/764 |
| 2010/0046477 A1 * | 2/2010 | Marin et al. | 370/332 |
| 2010/0323662 A1 * | 12/2010 | Dahlen et al. | 455/410 |

FOREIGN PATENT DOCUMENTS
EP    1 298 945 A    4/2003

OTHER PUBLICATIONS

3GPP TS 36.300; V1.0.0, Evolved Universal Terrestrial Radio Access (E-UTRA) and Evolved Universal Terrestrial Radio Access Networks (EUTRAN), Mar. 2007.
3GPP TS 29.060 V7.5.0, "GPRS (General Packet Radio Service) Tunnelling Protocol (GTP) across the Gn and Gp interface" Mar. 2007.
3GPP TS 36.413 V0.1.0, "Evolved Universal Terrestrial Access Network (E-UTRAN); S1 Application Protocol (S1AP)" Jun. 2007.
Alcatel Lucent: 3GPP LTE Presentation, [Online] May 22, 2007, XP002490899 Retrieved from the Internet: URL : www.3gpp.org/ftp/Information/presentations/Presentati ons_3GPP-LTEv2.ppt> [retrieved on Aug. 4, 2008].

* cited by examiner

*Primary Examiner* — Brian D Nguyen
(74) *Attorney, Agent, or Firm* — Harrington & Smith

(57) ABSTRACT

A mobile network telecommunication system is provided. The system includes a base station for sending flow control signal for a UE (user equipment) to a core network, the core network being capable of responding to the flow control signal by buffering packet data for the UE, and an interface for transmitting the flow control signal between the base station and the core network.

13 Claims, 2 Drawing Sheets

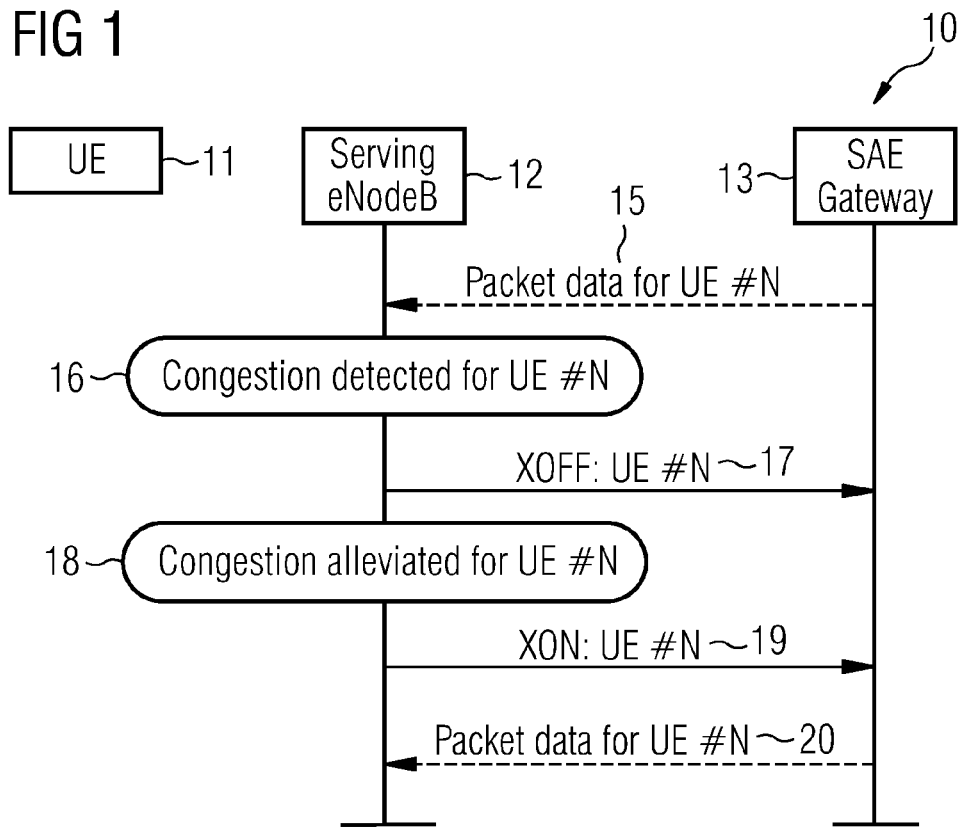
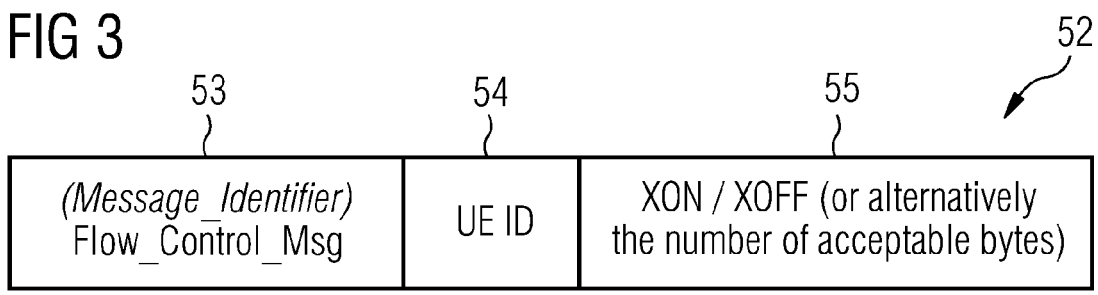
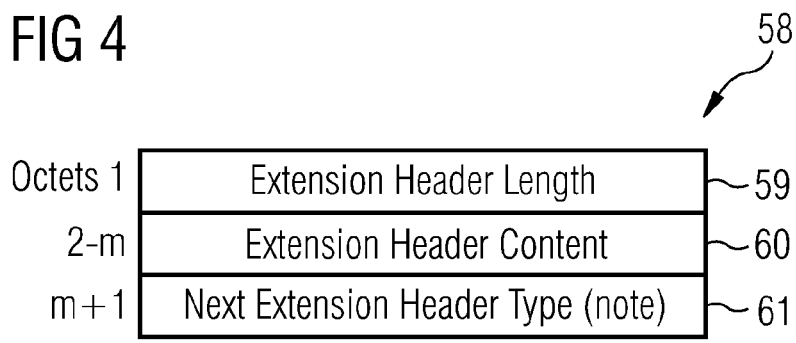

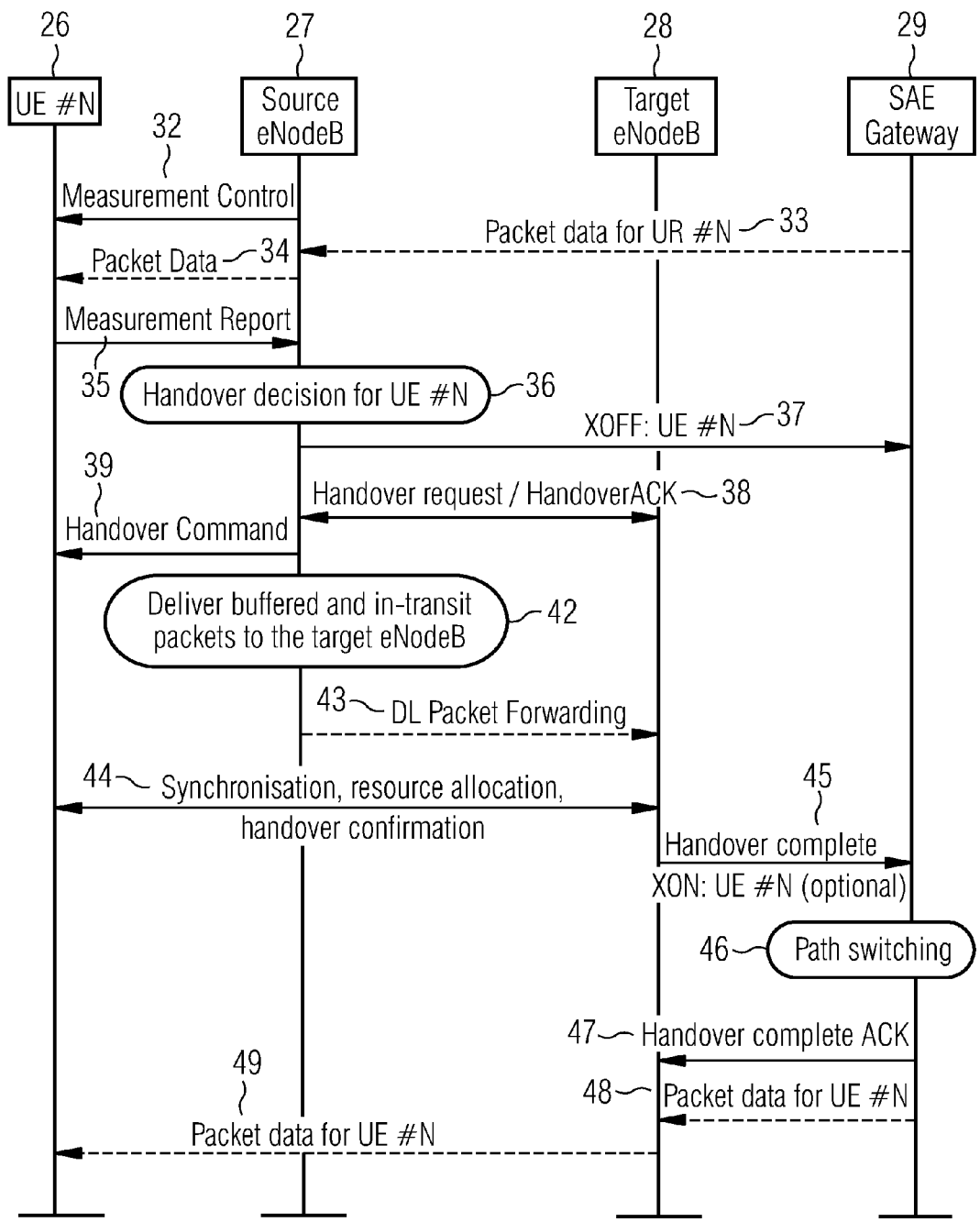

INTER-NETWORK-NODES FLOW CONTROL

The application relates to a packet data flow control mechanism in a telecommunication network.

A system architecture evolution (SAE) of the next generation public telecommunication system comprises a radio access network (RAN) and an evolved packet core (EPC), which is connected to the RAN by a S1 interface. A base station (BS) of the RAN exchanges packet data with a gateway of the ECP. The base station is also known as eNodeB. The exchange of packet data is via the S1 interface. The eNodeB can also transmit packet data with another eNodeB of the same RAN.

The application provides a mobile network telecommunication system that comprises a base station for sending flow control signal for a UE (user equipment) to a core network, the core network being capable of responding to the flow control signal by buffering packet data for the UE, and an interface for transmitting the flow control signal between the base station and the core network.

It is believed that a flow control mechanism can improved a transmission of packet data in a telecommunication network. A gateway of the telecommunication network is informed of a buffering status of a current serving base station (BS). The packet data can be delayed in being forwarded to the serving BS during a congestion or during a handover process. The gateway can be in the form of a SAE (system architecture evolution) gateway whilst the base station can in the form of an eNodeB.

The wireless-network telecommunication system can be in the form of a next generation public telecommunication system. The base station can be in the form of an eNodeB. The flow control signal can be received by a gateway of the core network. The gateway can be in the form of a SAE gateway. The interface can be in the form a S1 interface.

The flow control signal can be triggered by congestion in the transmission of packet data to the UE. The flow control signal can comprise a XON and an XOFF signalling. The flow control can also comprise a maximum amount of data for the UE that the base station can receive from the core network. The flow control can be signalled by a control plane or a user plane.

A method transmitting packet data within a mobile network telecommunication system is provided. The method comprising the steps of sending of packet data for a UE (user equipment) from a core network to a base station; sending of a sending-off message from the base station to the core network, if a packet data transmission parameter exceeds a predetermined criterion, ceasing the sending of the packet data for the UE by the core network in response the sending-off message and buffering any packet data for the UE by the core network; and sending a send-on message from the base station, if the packet data transmission parameter falls below the predetermined criterion, and resuming the sending of packet data from the core network to the base station.

The packet data transmission parameter may comprise a traffic congestion indicator. The packet data transmission parameter may comprise the UE handover.

The application provides an explicit per-UE flow control to prevent data overflow.

The flow control mechanism takes advantage of the normally high gateway buffering capacity, which is usually higher than eNodeB buffering capacity. The flow control mechanism explicitly informs the gateway not to forward packet data during a handover process. The packet data forwarding is resumed after the handover process is completed. The packet data can be later redirected to a target eNodeB. This is in contrast to most gateways that are not aware of the handover process until it is finished. These gateways would continue forwarding packet data of a handover UE (user equipment) to a source eNodeB, which are then forwarded to the handover UE through the target eNodeB. The flow control mechanism avoids inefficiency and error-prone, which are associated with most gateways.

Only tiny protocol overhead is usually required by the flow control mechanism. The flow control signalling can be easily included in a user plane or a control plane protocol on the S1 interface. Such mechanism enables a reuse of the S1 interface protocol with a minimal change.

FIG. 1 illustrates a message sequence chart for flow control signalling during eNodeB congestion, FIG. 2 illustrates a message sequence chart for flow control signalling during an inter-eNodeB handover, FIG. 3 illustrates a format of the flow control signalling of FIG. 1, and FIG. 4 illustrates a new extension header of a flow control message.

FIG. 1 illustrates a message sequence chart 10 for a flow control signalling during eNodeB congestion. The message sequence chart 10 depicts a flow control mechanism for sending of packet data in a 3GPP (Third Generation Partnership Project) LTE (Long Term Evolution) telecommunication network. The 3GPP LTE telecommunication network includes a UE (user equipment) 11, a serving eNodeB 12, and an evolved core network. The evolved core network includes a SAE (System architecture evolution) gateway 13. The serving eNodeB 12 is connected to the SAE gateway 13 by a S1 interface. The S1 interface is described in 3GPP LTE specification.

The UE 11 comprises a subscriber or a user and a terminal that is capable of communicating with the serving eNodeB 12. The terminal can be in the form of a mobile phone, or in the form of a computer that is connected to a mobile modem. The mobile modem can be included in the mobile phone. The eNodeB 12 transmits signals from the UE 11 to the SAE gateway 13 and it sends signals from the SAE gateway 13 of an EPC (evolved packet core) to the UE 11. The eNodeB 12 services the user equipments that are within its geographical service area or cell. The S1 interface provides a communication link between the serving eNodeB 12 and the SAE gateway 13. The SAE gateway 13 provides transfers of signal between the UE 11 and other networks.

The message sequence chart 10 commences with a step 15 of transmitting packet date for a particular UE #N by the SAE gateway 13.

Later, the serving eNodeB 12 detects congestion for the UE #N at step 16. The serving eNodeB 12 afterward responds to the congestion by sending a message 17 of XOFF (sending off) signalling for the UE #N to the SAE gateway 13. The XOFF signalling is also known as a XOFF command. Then, the SAE gateway 13 stops sending packet data for the UE #N and buffers or stores any packet data for the UE #N at the SAE gateway 13.

Afterwards the congestion is alleviated for the UE #N, as shown in step 18. The serving eNodeB 12 then sends a message 19 of a XON (sending on) signalling for the UE #N to the SAE gateway 13. The message 19 is for updating the SAE gateway 13 of the congestion. The SAE gateway 13 afterward resumes step 20 of sending the buffered packet data for the UE #N to the serving eNodeB 12.

Other parts of the flow control signalling are shown in an inter-eNodeB handover of FIG. 10.1.2.1 of 3GPP TS 36.300 V1.0.0, "Evolved Universal Terrestrial Radio Access (E-UTRA) and Evolved Universal Terrestrial Radio Access Network (E-UTRAN)", http://www.3gpp.org/ftp/Specs/html-info/36300.htm, herein called document D1.

The XON or the XOFF signalling is accomplished by one bit, which represents two states.

The XOFF signalling is used by the serving eNodeB 12 to inform the SAE gateway 13 to stop sending packet data to a particular UE. Similarly, the XON signalling is used the serving eNodeB 12 to inform the SAE gateway 13 to resume sending packet data to the particular UE.

The flow control signalling can be embedded in the S1 interface user plane transmission protocol, or, in the S1 interface-control plane protocol.

The S1 interface user-plane transmission protocol is a form of GTP-U (General Packet Radio Service (GPRS) tunneling protocol user) protocol, which is described in 3GPP TS 29.060 V7.5.0, "GPRS (General Packet Radio Service) Tunneling Protocol (GTP) across the Gn and Gp interface", http://www.3gpp.org/ftp/Specs/html-info/29060.htm, herein called document D2.

The S1 interface-control plane protocol is a S1 AP (application protocol), which is shown in 3GPP TS 36.413 V0.1.0, "Evolved Universal Terrestrial Access Network (E-UTRAN); S1 Application Protocol (S1AP)", http://www.3gpp.org/ftp/Specs/html-info/36413.htm, herein called document D3.

In a special case, the serving eNodeB 12 signals a flow control signalling with greater granularity. The flow control signal a maximum amount of data the serving eNodeB 12 will accept from the SAE gateway 13. The maximum amount of data is also known as number of acceptable bytes. The maximum amount of data can be represented in terms of bytes or Kbytes (kilobytes). The serving eNodeB 12 can change the maximum amount according to its internal buffering condition. In addition, the SAE gateway 13 may forward the packet data for a particular UE. The packet data is limited to the signalled maximum amount.

The S1 interface is an example of an interface between a gateway (GW) and a base station (BS).

The example of FIG. 1 avoids an overflow of packet data. Network functional nodes, which are involved in the forwarding of data from a gateway to an eNodeB, do not usually consider buffering of packet data. This could lead to the overflow of packet data, wherein the network functional nodes are unable to handle the packet data and may discard the packet data.

In a broad sense, the 3GPP LTE telecommunication network is a form of a mobile network telecommunication system. The serving eNodeB 12 is a type of a base station. The evolved core network is a form of a core network. The SAE gateway 13 is a type of a gateway. The S1 interface is a type of an interface between the base station and the gateway. The XON or XOFF signalling may be known as a XON or XOFF command or be known as a XON or XOFF request.

FIG. 2 depicts a message sequence chart 25 for flow control signalling during an inter-eNodeB handover. The message sequence chart 25 includes parts that are similar to the parts of FIG. 1. The similar parts have similar names and the description of the similar parts in FIG. 1 is incorporated by reference.

The message sequence chart 25 includes a plurality of messages transmitted among user equipment (UE) # N 26, a source eNodeB 27, a target eNodeB 28, and a SAE gateway 29. The source eNodeB 27 and the target eNodeB 28 are connected to the SAE gateway 13 by a S1 interface.

The message sequence chart 25 starts with sending of a measure control message 32 by the source eNodeB 27 to the UE #N 26. The measure control message 32 is for configuring measurement procedures by the UE #N 26 according to area restriction information. Later, the SAE gateway 29 sends packet data to the source eNodeB 27 for the UE #N 26 in a step 33. The source eNodeB 27 then send the received packet data to the UE #N 26 in a step 34. After this, the UE #N 26 is triggered to send a measurement report message 35 to the source eNodeB 27. The measurement report message 35 is characterise by a rules set, which includes system information and specification.

The source eNodeB 27 afterward performs a handover decision for the UE #N in a step 36. The handover decision to hand off the UE #N is based on information found within the measurement report message 35 and radio resource information.

Then, the source eNodeB 27 sends a message 37 of a XOFF command for the UE #N. The XOFF command instructs the SAE gateway 29 to stop sending the packet data for the UE #N 26. A message 38 of a handover request or a handover ACK (acknowledgement) is later transmitted between the source eNodeB 27 and the target eNodeB 28. The message 38 includes the handover request that is sent by the source eNodeB 27 to the target eNodeB 28. The handover request provides information for preparing the handover to the target eNodeB 28. The target eNodeB 28 later prepares for the handover and sends the handover request acknowledgement to the source eNodeB 27. The source eNodeB 27 afterwards sends a message 39 of a handover command to the UE #N 26. The handover command includes information received from the target eNodeB 28.

Later, the source eNodeB 27 performs a step 42 of delivering buffered and in-transit packets to the target eNodeB 28. The source eNodeB 27 then performs a step 43 of DL (downlink) packet forwarding to the target eNodeB 28. A message 44 of synchronisation, resource allocation, and handover confirmation is sent between the UE #N 26 and the target eNodeB 28. The message 44 comprises the synchronisation wherein the UE #N 26 synchronises to the target eNodeB 28 and starts acquiring resource allocation such as upload timing advance from the source eNodeB 27. The UE #N 26 sends the handover confirmation to the target eNodeB 28 when the UE #N 26 completes the handover procedure. After this, the target eNodeB 28 sends a message 45 of a handover complete to the SAE gateway 29. The message 45 may include a XON command for the UE #N. The message 45 informs the SAE gateway 25 that the UE #N 26 has changed cell. The XON command instructs the SAE gateway 29 to resume sending the packet data.

The SAE gateway 29 then performs a step 46 of path switching. Later, the SAE gateway 29 sends a message 47 of handover complete ACK to the target eNodeB 28. The message 47 confirms the completion of the handover. The SAE gateway 29 then resuming sends the packet data for the UE #N to the target eNodeB 28 in a step 48. The target eNodeB 28 afterward sends packet data for the UE #N to the UE #N in a step 49.

During the inter-eNodeB handover, the source eNodeB 27 set the number of acceptable bytes to zero in a flow control signal or flow control message. In this case, flow control mechanism for packet data is also similar to the message sequence chart 10 of FIG. 1. The flow control signal includes an identifier and a maximum number of acceptable data. The data is expressed in bytes or in Kbytes.

In a special case during the inter-eNodeB handover, the source eNodeB 17 set the number of maximum amount of data for transmission by the SAE gateway 29 to the serving eNodeB 27 to zero by a flow control signal. The flow control signal includes an identifier and the maximum number of transmitted data, which is expressed in bytes or Kbytes.

The example of FIG. 2 avoids loss of transmission efficiency due to re-transmission of packet data. Packet data in a downlink transfer may experience longer delay at a source eNodeB due to air interface congestion. During the inter-eNodeB handover, the source eNodeB may be unable to store in-transit packet data and have either to deliver the in-transit packet data to a target eNodeB, or to discard them. The source eNodeB may also be unable to forward the packet data directly to a particular UE, if a SAE gateway continuously delivers packet data to the source eNodeB.

Later, if the packet data are re-transmitted to the target eNodeB by the serving eNodeB, the transmission efficiency is lower and a data delay becomes longer. If those packet data are discarded by the serving eNodeB, the loss packet data may be recovered by possible transport layer re-transmission schemes.

FIG. 3 shows a format 52 of a message for the flow control signalling of FIG. 1 or 2. The format 52 includes three data fields. The first data field 53 is for storing a message identifier, which describes the message as a flow control message. The second data field 54 is for storing a UE (user equipment) ID (identifier). The third data field 55 is for storing a command name, namely XOFF command name, a XON command name, or for storing a number of acceptable bytes.

In a further embodiment, the signalling of flow control command is transmitted via a user plane on the S1 interface. The flow control command is piggybacked onto an uplink GTP-U protocol data unit (PDU), which carries an uplink user plane data from an eNodeB to a gateway. The uplink GTP-U protocol data unit is described in document D2. The flow control command is included in an extension header of the GTP-U protocol.

The format 58 of the extension header is depicted in FIG. 4. The extension header includes an extension header length field, extension header content field, and a next extension header type field.

The extension-header length field 59 occupies a first octet. The identity of the UE needs not necessarily to be added to the extension header, as the UE address is contained in the encapsulated IP (Internet Protocol) packet by the GTP-U PDU.

The extension header content field 60 includes an explicit amount of acceptable data, which then occupies multiple octets. The extension header content occupies a second to m octet position. A maximum number for the multiple octets is predetermined. The acceptable data is expressed in terms of bytes or Kbytes.

The new extension-header type field 61 is provided for the flow control message. The new extension header type occupies one octet, which at a (m+1) octet position.

The above embodiments and its principle can be implemented in the future network, such as NGMN (Next Generation Mobile Network). The implementation may provide the future network with inter-system congestion avoidance-alike procedures for its inter-WG (work group) and inter GW-BS (gateway-base station).

In short, the application provides a flow control signalling via a S1 interface, a two state flow-control message, and a fine data amount-based flow control message between an eNodeB and a SAE gateway.

The flow control between the eNodeB and the SAE gateway can be a two-state signalling. The eNodeB signals a XON or XOFF request to the gateway.

When a particular UE (user equipment) is in a handover process or when amount of buffered data in the eNodeB for that UE is quickly approaching an upper limit, the eNodeB can signal the XOFF request to the SAE gateway. The amount of buffered data can used to determine a congestion status.

Upon receiving the XOFF request, the SAE gateway stops forwarding packet data of that UE to the eNodeB. The packet data from an EPC (evolved packet core) for that UE is temporarily buffered in the SAE gateway. If the congestion status at the eNodeB for that UE is later alleviated, the eNodeB can send the XON request to the gateway, so that the gateway could continue forwarding the packet data for that UE to the eNodeB.

In the event of the UE completing the handover to another eNodeB, the SAE gateway would be notified of a switch in path and the SAE gateway may start forwarding the packet data of that UE to new serving eNodeB.

LIST OF ABBREVIATIONS

3GPP Third Generation Partnership Project
BS base station
eNodeB Base station in the evolved radio access network
EPC evolved packet core
E-UTRA Evolved Universal Terrestrial Radio Access
E-UTRAN Evolved Universal Terrestrial Radio Access Network
GPRS General Packet Radio Service
GTP GPRS Tunneling Protocol
GW gateway
Kbytes kilobytes
ID identifier
IP Internet Protocol
LTE Long term evolution
NGMN Next Generation Mobile Network
PDU protocol data unit
RAN Radio access network
S1AP S1 Application Protocol
SAE System architecture evolution
UE user equipment
WG work group
XOFF sending off
XON sending on

REFERENCE NUMBERS 10 message sequence chart
11 user equipment
12 serving eNodeB
13 SAE (System architecture evolution) gateway
15, 16 step
17 message
18 step
19 message
20 step
25 message sequence chart
26 UE # N
27 source eNodeB
28 target eNodeB
29 SAE gateway
32 message
33, 34 step
35 message
36 step
37, 38, 39 message
42, 43 step
44, 45 message
46 step
47 message
48, 49 step
52 format
53, 54, 55 data field 58 format
59, 60, 61 field

The invention claimed is:

1. A mobile network telecommunication system comprising:
    a base station for sending a flow control signal for a UE (user equipment) to a core network, the core network being capable of responding to the flow control signal by buffering packet data for the UE, and
    an interface for transmitting the flow control signal between the base station and the core network,
    wherein the flow control signal is triggered by congestion in the transmission of packet data to the UE.

2. The mobile network telecommunication system according to claim 1, wherein the mobile network telecommunication system is in the form of a next generation public telecommunication system.

3. The mobile network telecommunication system according to claim 1, wherein the base station is in the form of an eNodeB.

4. The mobile network telecommunication system according to claim 1, wherein the flow control signal is received by a gateway of the core network.

5. The mobile network telecommunication system according to claim 4, wherein the gateway is in the form of a SAE gateway.

6. The mobile network telecommunication system according to claim 1, wherein the interface is in the form of an S1 interface.

7. The mobile network telecommunication system according to claim 1, wherein the flow control signal comprises an XON and an XOFF signalling.

8. The mobile network telecommunication system according to claim 7, wherein the flow control comprises a maximum amount of data for the UE that the base station can receive from the core network.

9. The mobile network telecommunication system according to claim 7, wherein the flow control is signalled by a control plane or a user plane.

10. A method of transmitting packet data within a mobile network telecommunication system, the method comprising the steps of:
    sending of packet data for a UE (user equipment) from a core network to a base station;
    sending of a sending-off message from the base station to the core network, if a packet data transmission parameter exceeds a predetermined criterion, whereby a flow control signal is triggered by congestion in the transmission of packet data to the UE, ceasing the sending of the packet data for the UE by the core network in response to the sending-off message and buffering any packet data for the UE by the core network; and
    sending a send-on message from the base station, if the packet data transmission parameter falls below the predetermined criterion, and resuming the sending of packet data from the core network to the base station.

11. The method according to claim 10, wherein the packet data transmission parameter comprises a traffic congestion indicator.

12. The method according to claim 10, wherein the packet data transmission parameter comprises a UE handover.

13. A method of transmitting packet data within a mobile network telecommunication system, the method comprising the steps of:
    sending of packet data for a UE (user equipment) from a core network to a base station;
    sending of a sending-off message from the base station to the core network, if a packet data transmission parameter exceeds a predetermined criterion, ceasing the sending of the packet data for the UE by the core network in response to the sending-off message and buffering any packet data for the UE by the core network; and
    sending a send-on message from the base station, if the packet data transmission parameter falls below the predetermined criterion, and resuming the sending of packet data from the core network to the base station,
    wherein the packet data transmission parameter comprises a UE handover.

* * * * *